(12) United States Patent
Pullela et al.

(10) Patent No.: US 10,277,955 B1
(45) Date of Patent: *Apr. 30, 2019

(54) METHOD AND SYSTEM FOR RECONFIGURABLE TIME-INTERLEAVED ADC FOR DIRECT CONVERSION K-BAND AND L-BAND I/Q

(71) Applicant: MaxLinear, Inc., Carlsbad, CA (US)

(72) Inventors: Raja Pullela, Irvine, CA (US); Glenn Chang, Calrsbad, CA (US); Curtis Ling, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/881,654

(22) Filed: Oct. 13, 2015

Related U.S. Application Data

(63) Continuation of application No. 13/918,928, filed on Jun. 15, 2013, now Pat. No. 9,160,468.

(60) Provisional application No. 61/660,127, filed on Jun. 15, 2012.

(51) Int. Cl.
 *H04N 21/61* (2011.01)
 *H04H 40/90* (2008.01)
 *H04N 17/04* (2006.01)
 *H04N 21/436* (2011.01)

(52) U.S. Cl.
 CPC ......... *H04N 21/6143* (2013.01); *H04N 17/04* (2013.01); *H04N 21/43615* (2013.01); *H04N 21/615* (2013.01)

(58) Field of Classification Search
 CPC ............ G08B 13/1436; G08B 21/0269; G08B 25/10; G08B 21/0213
 See application file for complete search history.

(56) References Cited

U.S. PATENT DOCUMENTS

| | | | | |
|---|---|---|---|---|
| 6,067,614 A | * | 5/2000 | Goto ................... | G06F 9/30058 712/218 |
| 8,799,964 B2 | * | 8/2014 | Chang .................... | H04N 21/45 725/71 |
| 2002/0104920 A1 | * | 8/2002 | Thompson ................ | G06F 8/65 244/3.14 |

(Continued)

FOREIGN PATENT DOCUMENTS

KR 100783502 B1 * 12/2007

*Primary Examiner* — Bobbak Safaipour
(74) *Attorney, Agent, or Firm* — McAndrews, Held & Malloy, Ltd.

(57) ABSTRACT

A signal receiver chip may be configured to receive a satellite signal, and when the satellite signal is partially-processed off-chip, to bypass at least a portion of processing functions applied in the signal receiver chip during processing of satellite signals. The bypassed processing functions may comprise or correspond to signal band conversions. The satellite signal chip may generate an output signal, corresponding to the satellite signal, with the output signal being configured for communication to a peer device (e.g., satellite STB). The output signal may be generated and/or configured such that to enable distributing content carried in the output signal to a plurality of client devices in a local network serviced by the peer device. The signal receiver chip may combine a plurality of portions, corresponding to a plurality of satellite signals, into the output signal.

20 Claims, 6 Drawing Sheets

(56) References Cited

U.S. PATENT DOCUMENTS

| | | | | |
|---|---|---|---|---|
| 2005/0071877 | A1* | 3/2005 | Navarro | H04H 40/90 725/68 |
| 2005/0275758 | A1* | 12/2005 | McEvilly | H04N 7/17318 348/725 |
| 2006/0225098 | A1* | 10/2006 | James | H01Q 1/125 725/63 |
| 2013/0039444 | A1* | 2/2013 | Porret | H04B 1/0007 375/316 |
| 2013/0205349 | A1* | 8/2013 | Chang | H04N 21/45 725/70 |
| 2013/0268977 | A1* | 10/2013 | Ling | H01Q 21/28 725/68 |
| 2013/0271320 | A1* | 10/2013 | Trerise | H01Q 1/1257 342/359 |
| 2014/0010269 | A1* | 1/2014 | Ling | H04B 3/00 375/222 |
| 2014/0337897 | A1* | 11/2014 | Chan | H04L 27/36 725/68 |
| 2015/0026736 | A1* | 1/2015 | Chang | H04N 21/45 725/71 |
| 2015/0089549 | A1* | 3/2015 | Trerise | H01Q 21/28 725/68 |

\* cited by examiner

METHOD AND SYSTEM FOR RECONFIGURABLE TIME-INTERLEAVED ADC FOR DIRECT CONVERSION K-BAND AND L-BAND I/Q

CLAIM OF PRIORITY

This application is a continuation of U.S. patent application Ser. No. 13/918,928, filed Jun. 15, 2013, which in turn makes reference to, claims priority to, and claims benefit from the U.S. Provisional Patent Application Ser. No. 61/660,127, filed Jun. 15, 2012.

This patent application also makes reference to:
U.S. patent application Ser. No. 13/762,939, filed Feb. 8, 2013; and
U.S. patent application Ser. No. 13/857,755, filed Apr. 5, 2013.

Each of the above stated applications is hereby incorporated herein by reference in its entirety.

TECHNICAL FIELD

Aspects of the present application relate to communications. More specifically, certain implementations of the present disclosure relate to a reconfigurable time-interleaved ADC for direct conversion K-band and L-band I/Q.

BACKGROUND

Existing methods and systems for installing and aligning a receiver used in receiving various wireless signals can be cumbersome and inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for a reconfigurable time-interleaved ADC for direct conversion K-band and L-band I/Q, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

Certain embodiments of the invention may be found in method and system for a reconfigurable time-interleaved ADC for direct conversion K-band and L-band I/Q. As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
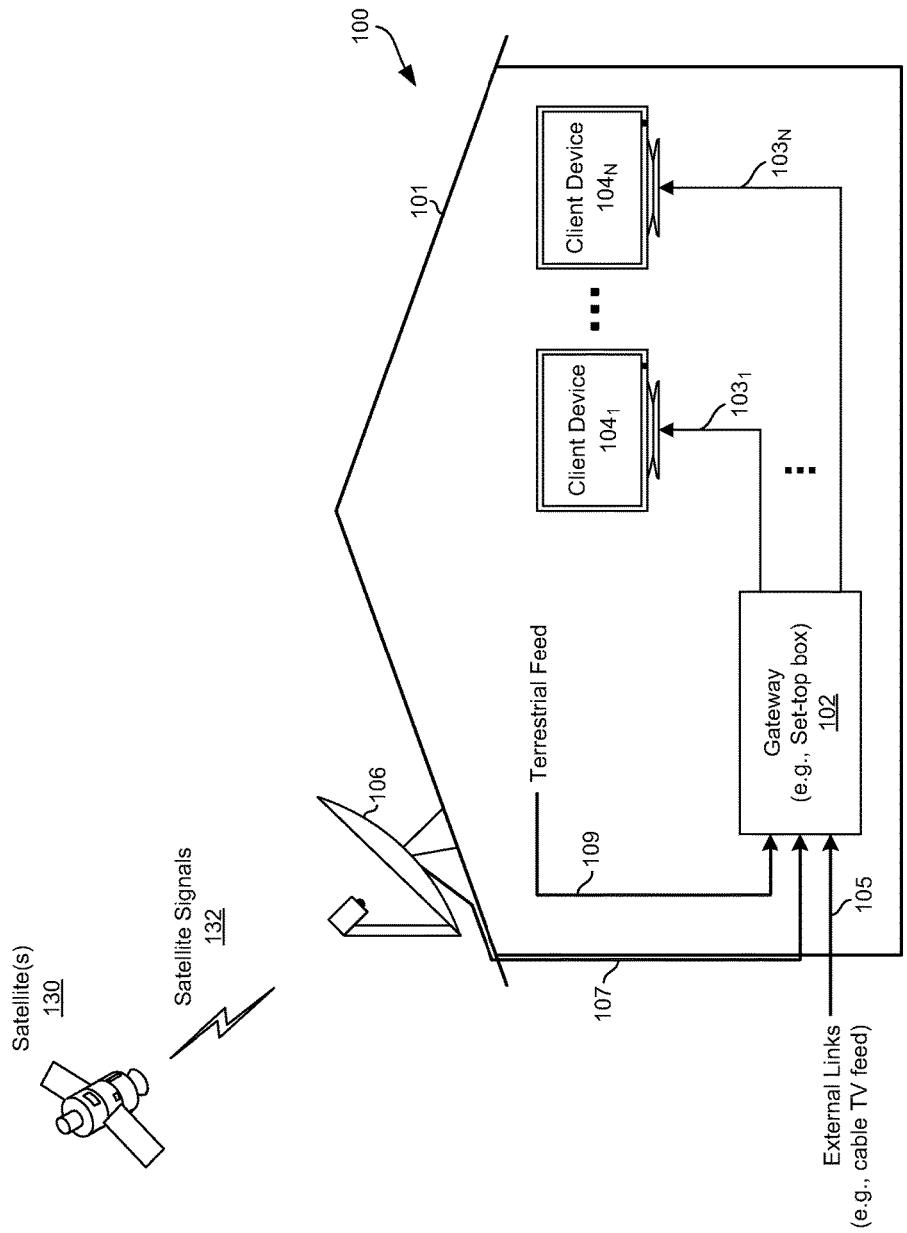
FIG. 1 illustrates an example network that supports reception of satellite broadcasts.

FIG. 1 illustrates an example network that supports reception of satellite broadcasts. Referring to FIG. 1, there is shown an in-premises network 100.

The in-premises network 100 may be configured to service particular premises 101 (e.g., residential or commercial). In this regard, the in-premises network 100 may be configured to provide and/or enable broadband and/or television (or other similar content broadcast) access in the premises 101. The in-premises network 100 may comprise, for example, a gateway 102 and a plurality of client devices $104_1$-$104_N$.

The gateway 102 may comprise suitable circuitry, interfaces, logic, and/or code for providing and/or supporting various services or functions in a particular location (e.g., the premises 101), such as to service a plurality of client devices (e.g., the client devices $104_1$-$104_N$) in that location, with which the gateway 102 may communicate over point-to-point or indirect links (e.g., a plurality of links $103_1$-$103_N$). The services or functions that may be provided and/or supported by the gateway 102 may pertain to, for example, broadband access, broadcast/television access, content distribution, or the like. In this regard, the gateway 102 may be configured to support reception of signals communicated from external entities (e.g., cable, terrestrial, or IP head-ends, satellites, etc.), and process the signals as necessary for obtaining data (e.g., content) carried thereby, and outputting the data via corresponding signals over the internal links $103_i$ to the client devices $104_i$. Similarly, the gateway 102 may be operable to receive signals communicated from the client devices $104_i$, over the internal links $103_i$, and process the signals as necessary for obtaining data and outputting the data via corresponding signals to the external entities. Accordingly, the term "gateway" in this disclosure refers to a client device which may perform satellite set-top box (STB) functions, cable television receiver functions, terrestrial television receiver functions, WAN/LAN modem functions, etc. In this regard, "satellite set-top box" functions may comprise functions utilized for delivering data from the cable head-ends, satellites, broadband head-ends, web servers, and the like to devices within the premises.

In some instances, at least some of the data utilized in the in-premises network 100 may be received from external sources, such as from broadband or broadcast sources (e.g., satellites, the terrestrial TV head-ends, and/or the cable head-ends). In this regard, the gateway 102 may be utilized to service the in-premises network 100, such as, for example, by providing to the client devices $104_1$-$104_N$ access to external networks/connections. In such instances, the gateway 102 may facilitate communication of signals between the client devices $104_1$-$104_N$ and the external sources. For example, the gateway 102 may be utilized to route communications between cable head-ends 120 and one or more of client devices $104_1$-$104_N$. In this regard, a client device $104_i$ may receive from the cable head-end 120 streams containing, e.g., multimedia content. In some instances, the interactions with the cable head-end may be bi-directional. For example, client device $104_i$ may transmit to the cable head-end 120 signals or streams, such as containing user commands or requests (e.g., for particular content) or the like. Communications between client devices and head-ends may be configured in accordance with particular protocols. For example, cable communications may be configured in accordance with DOCSIS protocol(s).

The client devices $104_1$-$104_N$, may comprise devices that may communicate with the gateway 102, such as, for example, via one or more point-to-point links (e.g., a plurality of links $103_1$-$103_N$). In this regard, the client devices $104_1$-$104_N$ may be operable to utilize services or functions provided by the gateway 102. For example, in instances where the gateway 102 is utilized to support broadband/television access and/or content distribution, the client devices $104_1$-$104_N$ may comprise televisions and similar devices that may be used in consuming (e.g., displaying or playing) content that may be broadcasted (e.g., via terrestrial signals, satellite signals, cable signals, and/or over the Internet) and received via the gateway 102. The disclosure is not limited, however, to any particular type of client device. The plurality of links $103_1$-$103_N$ may comprise, for example, wired, wireless, and/or optical links that may be suited for use in an environment such as the in-premises network 102. For example, the links $103_1$-$103_N$ may comprise wired connections (e.g., HDMI connections, Display Port links, Multimedia over Coax Alliance (MoCA) links, Ethernet connections, or the like), and/or wireless connections (e.g., Wi-Fi, ZigBee, wireless USB, or the like).

In operation, the in-premises network 100 may be setup and/or used to provide various services (e.g., broadband, broadcast and/or television access) within the premises 101. In this regard, the in-premises network 100 may comprise a network configured based on one or more type(s) of interface(s) or standard(s), to interconnect various devices (e.g., the gateway 102 and client devices $104_1$-$104_N$) within a physical space (e.g., the premises 101), to allow connectivity therebetween and/or to access networks (i.e., external to the premises 101). The in-premises network 100 may be setup as Internet Protocol (IP) based network, using WiFi, Ethernet, Bluetooth, and/or similar connections, and may be configured to support various IP-based services such as broadband or IP-based TV (IPTV) services. The disclosure, however, is not so limited.

In various implementations, the gateway 102 may be configured to support or enable providing services in the in-premises network 100—e.g., services that may pertain to, for example, broadband or broadcast/television access, and/or content distribution in the in-premises network 100. In this regard, in some instances at least some of the data communicated to or from devices in the in-premises network 100 (e.g., the client devices $104_1$-$104_N$) may originate from (or be destined for) entities external to the network 100. Thus, the gateway 102 may be utilized to provide to the client devices $104_1$-$104_N$ access to external devices, systems, and/or networks. In this regard, communication involving a client may be unidirectional (e.g., downlink transmissions of broadcast content), or bi-directional (e.g., downlink streams of content and uplink communication of user related data, such as status information, validation/authentication responses, and/or user commands or requests). Accordingly, the gateway 102 may be configured to facilitate and/or handle reception and/or transmission of signals that may be used to enable content distribution and/or broadband accessibility in the in-premises network 100 (e.g., to the plurality of client devices $104_1$-$104_N$). This may be achieved by configuring the gateway 102 to support appropriate internal and/or external connections, such as, for example, to enable connectivity to the plurality of client devices $104_1$-$104_N$, and/or to various external and/or remote devices, systems, or networks. In this regard, the gateway 102 may be operable to support communications over a plurality of external links (i.e., links that may be utilized in connecting gateway 102 to external entities, such as broadcast or service head-ends), communications over a plurality of internal links (i.e., links used within the in-premises network 100, such as links $103_1$-$103_N$ which may be utilized in connecting the gateway 102 to the client devices $104_1$-$104_N$), and/or to process signals communication over these links.

For example, the gateway 102 may be configured to obtain content distributed in the in-premises network 100 from one or more broadcast head-end nodes. In this regard, the content delivered to the gateway 102 may be broadcast using wired or wireless signals. For example, the gateway 102 may be configured to terminate wired external links (e.g., links 105), which may be configured to enable communication of content from suitable head-ends over wired connections. For example, links 105 may comprise, a coaxial or twisted-pair cable and/or an optical fiber which carries physical layer symbols in accordance with, for example, DSL, DOCSIS, or Ethernet standards (e.g., to facilitate cable television, terrestrial television, and/or Internet accessibility). Accordingly, the links 105 may be utilized to enable connectivity between the gateway 102 and one or more cable (or other similar service provider) head-ends.

The gateway 102 may also be configured to support wireless connectivity to external/remote sources (e.g., broadcast head-ends)—i.e. content may be delivered to the network 100 from broadcast head-ends over suitable wireless links. For example, the gateway 102 may support reception of television and/or satellite broadcasts, which may be used to communicate content (e.g., television channels). Wireless based connectivity may utilize, in some instances, local auxiliary devices or systems for enabling the wireless communication (reception) of signals. For example, for terrestrial broadcasts, antenna assemblies may be utilized (e.g., being installed on the roof of the premises 101) to enable reception of terrestrial TV broadcasts. In this regard, terrestrial broadcasts may comprise communication (typically only downlink communication, but the disclosure is not so limited) of RF signals (e.g., UHF or VHF band signals), modulated in accordance with particular analog or digital standards. Example of television modulation/transmission standards may comprise NTSC, PAL or SECAM for analog television, and ATSC or DVB standards for digital television. The disclosure, however, is not limited to any particular standard/bands for terrestrial TV signals. The received terrestrial signals may be fed (unprocessed and/or with at least some processing at the reception point—e.g., within the antenna assembly) to the gateway 102 (e.g., via a link 109). In this regard, the link 109 may comprise one or more wired, wireless, and/or optical links. The link 109 may comprise, for example, a coaxial and/or twisted-pair cable.

Similarly, for satellite broadcasts, a satellite reception assembly 106 may be utilized (e.g., installed on the roof of the premises 101) to enable satellite based communications (e.g., allow reception of satellite based broadcasts, and, in some instances, transmission—i.e. uplink, of satellite communications). In this regard, a satellite 130 may be utilized to communicate satellite signals 132 (which may typically comprise only downlink communication signals, but the disclosure is not so limited). In this regard, the satellite signals 132 may be utilized to broadcast satellite television content. The satellite signals 132 may comprise, for example, K, Ka, and/or Ku band Direct Broadcast Satellite (DBS) signals. The disclosure, however, is not limited to any particular type of satellite signal.

The satellite reception assembly 106 may be a satellite "dish". In this regard, the satellite reception assembly 106 may comprise a reflector—for capturing satellite signals (e.g., the satellite signals 132), and circuitry operable to receive and to process the received satellite signals, such as to recover data carried in the satellite signals (e.g., television channels, media content, etc.), and configure a suitable output corresponding to the recovered data for transmission to other devices that may handle use and/or distribution of the data (e.g., to the gateway 102 via a link 107). For example, the satellite reception assembly 106 may comprise a housing, which may be mounted on a boom at or near the focal point of a parabolic reflector, and may comprise circuitry for capturing and handling satellite signals. For example, the circuitry may provide low-noise block downconverter (LNB) functionality, and/or additional functions (generating output for communication of the link 107). The LNB functionality may comprise performing such operations as low-noise amplification, filtering, and downconverting on a particular received RF (satellite) signals, to enable generating corresponding IF signals. For example, the IF signals may be in the L-band, half-L-band (950-1450 MHz), extended-L-band (or 'Ext-L-band', 250-2150 MHz, 300-2350 MHz), or the like. The link 107 may comprise one or more wired, wireless, and/or optical links. The link 107 may comprise, for example, a wired (e.g., coaxial and/or twisted-pair) and/or wireless communication medium which carries physical layer symbols in accordance with, for example, Multimedia over Coax Alliance (MoCA), Ethernet, and/or DBS standards.

In various implementations, the satellite reception assembly 106 may be configured to receive and/or handle a plurality of satellite signals (e.g., signals corresponding to different satellite broadcasts). In this regard, the plurality of satellite signals may comprise signals transmitted by different satellites and/or signals transmitted by the same satellite with different characteristics (e.g., polarization). Accordingly, the satellite reception assembly 106 may be operable to, for example, receive the different signals, process them, and/or generate one or more corresponding outputs that may forwarded to other devices (e.g., the gateway 102). In this regard, the gateway 102 may be configured to concurrently handle multiple satellite feeds (e.g., by incorporating multiple LNBs). An example multiple LNB implementation is shown in and described in more detail with respect to FIG. 2.

In some instances, the satellite reception assembly 106 may also be configured to support concurrent handling of multiple satellite inputs (i.e. at the same time). For example, the satellite reception assembly 106 may be configured to combine (directly, using circuitry incorporated into the satellite reception assembly 106, or by using additional/separate component(s) coupled thereto) outputs corresponding to multiple (concurrently) received satellite inputs, to enable increasing the number of (concurrent) viewers, while simultaneously minimizing installation and service costs. In this regard, rather than utilizing multiple links (similar to link 107) between the satellite reception assembly 106 and the gateway 102, data corresponding to the different satellite signals may be combined onto the same link (e.g., the link 107).

For example, the satellite reception assembly 106 may be configured to such techniques as channel stacking and band stacking, which may be utilized, when handling multiple satellite receptions, to combine contents corresponding to different inputs onto a single output. In this regard, channel stacking may be implemented by taking multiple channels from different frequency bands and stacking or combining them together for transmission over the same physical medium (e.g., the link 107). Similarly, band stacking may be implemented by taking a plurality of frequency bands (or sub-bands) and stacking or combining them together for transmission.

Figure 2:
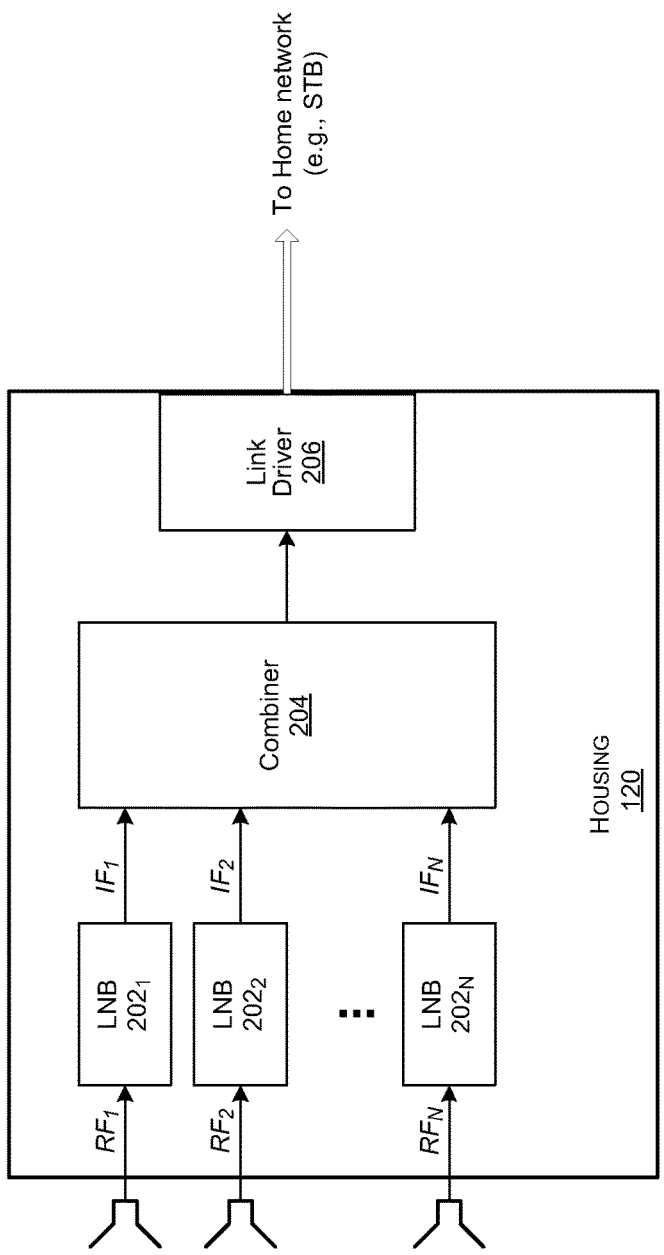
FIG. 2 illustrates an example housing component of a satellite television receiver assembly that may support multiple satellite inputs.

FIG. 2 illustrates an example housing component of a satellite television receiver assembly that may support multiple satellite inputs. Referring to FIG. 2, there is shown a housing 200.

The housing 200 may comprise suitable circuitry, interfaces, logic, and/or code for handling and/or processing signals, particularly satellite signals. In this regard, the housing 200 may be incorporate into a satellite reception assembly (e.g., the satellite reception assembly 106 of FIG. 1) for use in capturing, receiving, and/or processing satellite signals (e.g., the satellite signals 132 of FIG. 1), for example to enable recovering data carried in the satellite signals, and configuring suitable output(s) corresponding to the recovered data for transmission to other devices that may handle use and/or distribution of the data (e.g., to the gateway 102 via the network link 107). The housing 120 may be, for example, part of the satellite reception assembly 106 (e.g., it may be mounted on a boom at or near the focal point of a parabolic reflector). In this regard, the housing 120 may comprise a circuitry corresponding to low-noise block downconverter (LNB) functionality, and additional circuitry—e.g., for processing the signals in manner that ensure generating desired output (e.g., combiner circuitry and/or link driver function).

In various implementations, the housing 200 may be configured to support reception of multiple signals, separately and/or concurrently, and forwarding content corresponding to one or more of these signals (e.g., to a STB or the like). In this regard, the housing 200 may comprise circuitry for supporting handling of plurality of signals (e.g., satellite signals). For example, the housing 200 may comprise a plurality of low-noise block downconverters (LNBs) $202_1$-$202_N$, a combiner 204, and a link driver 206. In some instances, the housing 200 may be configured to support integrated stacking, for enabling channel and/or band stacking, to facilitate servicing multiple users based on multiple feeds.

Each of the LNBs $202_1$-$202_N$ may comprise circuitry operable to receive and handle RF satellite signals, which may be captured via a reflector of a satellite reception assembly. In this regard, each LNB $202_i$ may be configured to perform such functions as low-noise amplification, filtering, and downconverting on a particular received RF (satellite) signals, to enable generating corresponding IF signals. In this regard, the IF signals may be in the L-band, half-L-band (950-1450 MHz), extended-L-band (250-2150 MHz), 300-2350 MHz), and the like. The disclosure, however, is not so limited, and the IF signals may span any suitable frequency range. Having N (an integer number) LNBs in the housing 200, as illustrated in FIG. 2, may allow receiving N satellite (RF) signals, labeled $RF_1$ to $RF_N$. For example, the $RF_1$ to $RF_N$ may comprise K, Ka, and/or Ku band Direct Broadcast Satellite (DBS) signals. In some instances, each $RF_i$ signal may correspond to a unique/distinct satellite signal, with the signals differing, for example, based on the source or the polarization (e.g., $RF_1$ may correspond to a first polarization of a first satellite, $RF_2$ may correspond to second polarization of the first satellite, $RF_3$ may correspond to a first polarization of a second satellite, and so on).

The combiner 204 may be configured to process and combine input signals corresponding to the received RF signals ($RF_1$ to $RF_N$), such as, for example, the outputs of the LNBs $202_1$-$202_N$ which in turn may correspond to the received RF signals ($RF_1$ to $RF_N$). For example, the combiner 204 may be operable to amplify, downconvert, filter, and/or digitize at least a portion of the input signals. The combiner 204 may be configured to support full-spectrum—i.e., to capture an entire spectrum of each of one or more protocols of interest may be concurrently digitized, or to only digitize a portion of the input signals, such as depending on which channels (or sub-bands) in the signals are selected by client devices (e.g., which television channels are being consumed by the client devices). Once the processing of the input signals (or portions thereof) is complete, the combiner 204 may be operable to recover information carried in the signals (e.g., one or more channels contained therein), and may generate output signals carrying the recovered information. The output signals may be sent to the link driver 208, for transmission thereby (e.g., to the gateway). In some instances, the output signals may be processed in the combiner before being forwarded to the link driver 208. For example, the combiner 204 may be operable to convert to analog, upconvert, filter, and/or amplify the output signals.

The link driver 206 may be operable to process signals generated via the combiner 204 (e.g., comprising recovered information) and generate signals that may be transmitted onto a link to a corresponding link-peer device, such as a gateway/STB (e.g., link 107 to gateway 102 of FIG. 1) in a format supported by the link-peer device. For example, the link driver 206 may be operable to packetize and transmit data received via signals $RF_1$-$RF_N$, in accordance with one or more networking standards (e.g., Ethernet, Multimedia over Coax Alliance (MoCA), DOCSIS, or the like) to a link-peer device that receives satellite data using such standards. Additionally, or alternatively, the link driver 206 may be operable to perform operations (e.g., digital to analog conversion, modulation, frequency conversion, etc.) for outputting the data according to one or more multimedia standards (e.g., ATSC, DVB-S, ISDB-S, and the like) to enable receiving satellite data by devices using such standards. The output of the link driver 206 may comprise a plurality of IF signals, in a particular range to which the link-peer device (gateway/STB) may tune. For example, each of the IF signals may be in the L-band (950 MHz to 2150 MHz).

In operation, the housing 200 may be configured to receive and/or handle (concurrently) multiple satellite inputs. For example, the LNBs $202_1$-$202_N$ may be used to concurrently receive a plurality of satellite signals ($RF_1$-$RF_N$)—e.g., generating a corresponding plurality of signals $IF_1$-$IF_N$, which may then be combined (via the combiner 204) onto a single output that may be transmitted over a single link (via the link driver 206), such as for example to a particular device configured for handling the multiple (concurrent) satellite feeds (e.g., the gateway 102).

In various implementations, satellite signal receiver assemblies (e.g., assembly 106) or components thereof (e.g., the housing 200) may incorporate use of optimized circuitry that may allow for on-chip downconversion of satellite signals while also being able to handle partially processed signals (e.g., signals subjected to downconversion off-chip). For example, such circuit/chip may be configurable to support, concurrently, signals corresponding to the over-the-air bands (e.g., K/Ku/Ka-band signals, or simply 'K-band')—i.e., performing LNB functionality on-chip, as well as handling signals corresponding to down-converted bands (e.g., L/half-L/Ext-L-band signals, or simply 'L-band')—i.e., from external LNB circuitry. For example, with reference to FIG. 2, in an example implementation, one or more of the LNBs $202_1$-$202_N$ may be incorporated into a single chip, which in turn may be configured to support handling already-processed signals from the remaining ones of the LNBs $202_1$-$202_N$. An example implementation scheme is shown in and described with respect to FIG. 3.

Figure 3:
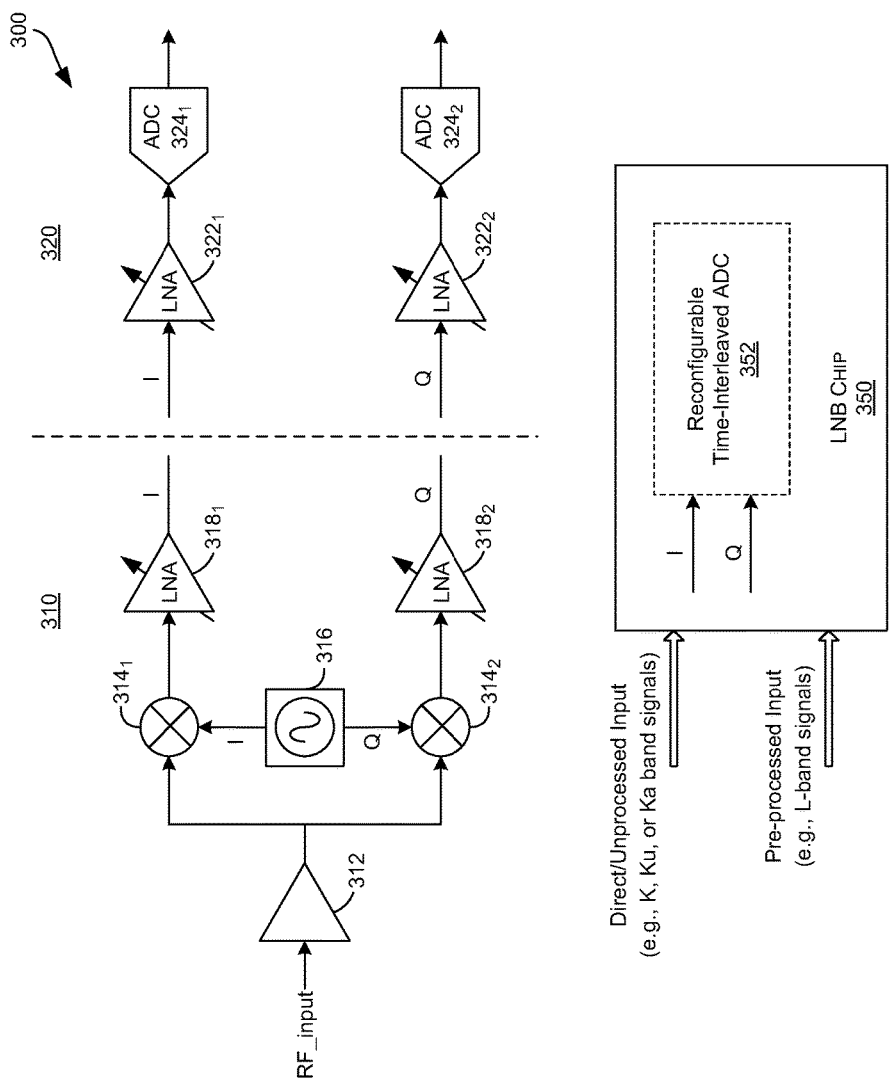
FIG. 3 illustrates a portion of an example receiver that may use a reconfigurable time-interleaved analog-to-digital converter (ADC) for direct conversion K-band and L-band I/Q.

FIG. 3 illustrates a portion of an example receiver that may use reconfigurable time-interleaved analog-to-digital converter (ADC) for direct conversion K-band and L-band I/Q. Referring to FIG. 3, there is shown a signal receiver 300.

The signal receiver 300 may comprise suitable circuitry, interfaces, logic, and/or code for handling and/or processing multiple signals (e.g., satellite signals). In this regard, as shown in the portion of signal receiver shown in FIG. 3, the signal receiver 300 may be operable to perform direct downconversion (e.g., from K-band to L-band), such as to enable on-chip downconversion processing. Additionally, the signal receiver 300 may also be configured to support handling pre-processed (e.g., already-downconverted) signals (e.g., using external LNBs). The signal receiver 300 may correspond to at least a portion of the housing 200 when implemented in accordance with the present disclosure. The signal receiver 300 may comprise, for example, a K-band direct conversion receiver (DCR) portion 310 and an L-band portion 320.

The K-band DCR portion 310 can down-convert received K-band signals (e.g., K, Ku, and Ka signals) typically used in over-the-air satellite transmission, to a lower band (e.g., 1 GHz, corresponding to L-band typically used for IF signals corresponding to satellite receptions). In an example implementation, the K-band DCR portion 310 may be configured to perform the down-conversion based on quadrature processing. For example, the K-band DCR portion 310 may comprise an input amplifier 312, mixers $314_1$ and $314_2$, a local oscillator (LO) 316, and output amplifiers $318_1$ and $318_2$. In this regard, the input amplifier 312 may comprise a programmable amplifier. The input amplifier 312 may be used in amplifying a received satellite (RF) signal, for example to prepare the signal for mixing (with local (I/Q) signals). The LO 316 may be operable to generate local signals, having particular frequencies, such as for use in signal processing operations. For example, the LO 316 may be operable to generate in-phase (I) and quadrature signals (Q) signals corresponding to particular input RF signals (e.g., K-band signals), to allow extraction of in-phase and quadrature components. The mixers $314_1$ and $314_2$ may be operable to mix (e.g., multiply) a plurality of signals. For example, the mixers $314_1$ and $314_2$ may be used to apply I/Q signals generated by the LO 316 to copies of the input signals (after amplification), for example to enable extraction of in-phase and quadrature components of the input signal. The output amplifiers $318_1$ and $318_2$ may be operable to amplify signals. In this regard, the output amplifiers $318_1$ and $318_2$ may be used in amplifying signals generated by the mixers $314_1$ and $314_2$. The output amplifiers $318_1$ and $318_2$ may comprise, for example, low-noise amplifiers (LNAs). Accordingly, the K-band DCR portion 310 may process received (unprocessed) satellite signals (e.g., K-band signals) to generate corresponding down-converted (e.g., in L-band) I/Q components. These I/O components may then be passed to the L-band portion 320.

The L-band portion 320 may then be configured to handle and/or process the down-converted signals (e.g., to 1 GHz signals). In this regard, the L-band portion 320 may be configured to perform such functions on the signals as analog-to-digital conversion. For example, the L-band portion 320 may comprise input amplifiers $322_1$ and $322_2$, and analog-to-digital converters (ADCs) $324_1$ and $324_2$. The input amplifiers $318_1$ and $318_2$ may be operable to amplify signals—e.g., the (I/Q) signals generated by the K-band DCR portion 310). The input amplifiers $318_1$ and $318_2$ may comprise low-noise amplifiers (LNAs). The ADCs $324_1$ and $324_2$ may be operable to perform reconfigurable, time-interleaved analog-to-digital conversions. Accordingly, the L-band portion 320 may be utilized to perform analog-to-digital conversion (e.g., in a reconfigurable, time-interleaved manner) on the in-phase (I) signals and another for the quadrature (Q) signals (in the L-band) that are generated by the K-band DCR portion 310 from processing (e.g., down-converting) received K-band signals.

Also shown in FIG. 3 is a LNB chip 350, which may comprise a reconfigurable time-interleaved analog-to-digital convertor (ADC) component 352. In this regard, the LNB chip 350 may incorporate similar functionality as, for example, described with respect to the portions 310 and 320 of the signal receiver 300—i.e., being operable to provide downconversion of satellite signals (e.g., of K-band to L-band). In addition, the LNB chip 350 may be operable to handle pre-processed signals (e.g., K-band signals already down-converted to L-band or Extended L-band). Accordingly, in an example implementation, the LNB chip 350 may be incorporated into the signal receiver 300, to provide an on-chip full processing path (e.g., down-conversion, such as form K-band to L-band, and additional processing, such as analog-to-digital conversion as applied to the L-band signals), while also providing the LNB chip 350 with the capability to support pre-processed signals (e.g., perform only analog-to-digital conversion, since the input signals are already downconverted). The reconfigurable time-interleaved ADC component 352 may be configured to performed analog-to-digital conversion, doing so in adaptive manner—e.g., being operable to perform analog-to-digital conversion on different bands (such as both K-band and L-band).

For example, the ADC component 352 may be operable to handle both outputs of direct conversion K-band I/Q (e.g., inputs to K-band DCR portion 310), or handling L-band I/Q signals (e.g., inputs to L-band portion 310). In this regard, handling the direct conversion K-band I/Q may incorporate performing down-conversion (from K-band to L-band). Accordingly, the reconfigurable time-interleaved ADC component 352 may be utilized to enable handling (within the LNB chip 350) both on-chip down-converted signals and off-chip down-converted signals—i.e., the ADC component 352 may be adaptively configured to handle I/Q K-band input(s), or to handle down-converted L-band I/Q input(s). Although the reconfigurable time-interleaved ADC component 352 is shown as a single (ADC) block, the ADC component 352 may actually incorporate a plurality of individual ADCs—e.g., for each of the (I/Q) inputs. An example implementation of a single chip for handling unprocessed and (partially) processed satellite signals is shown in and described with respect to FIG. 4.

Figure 4:
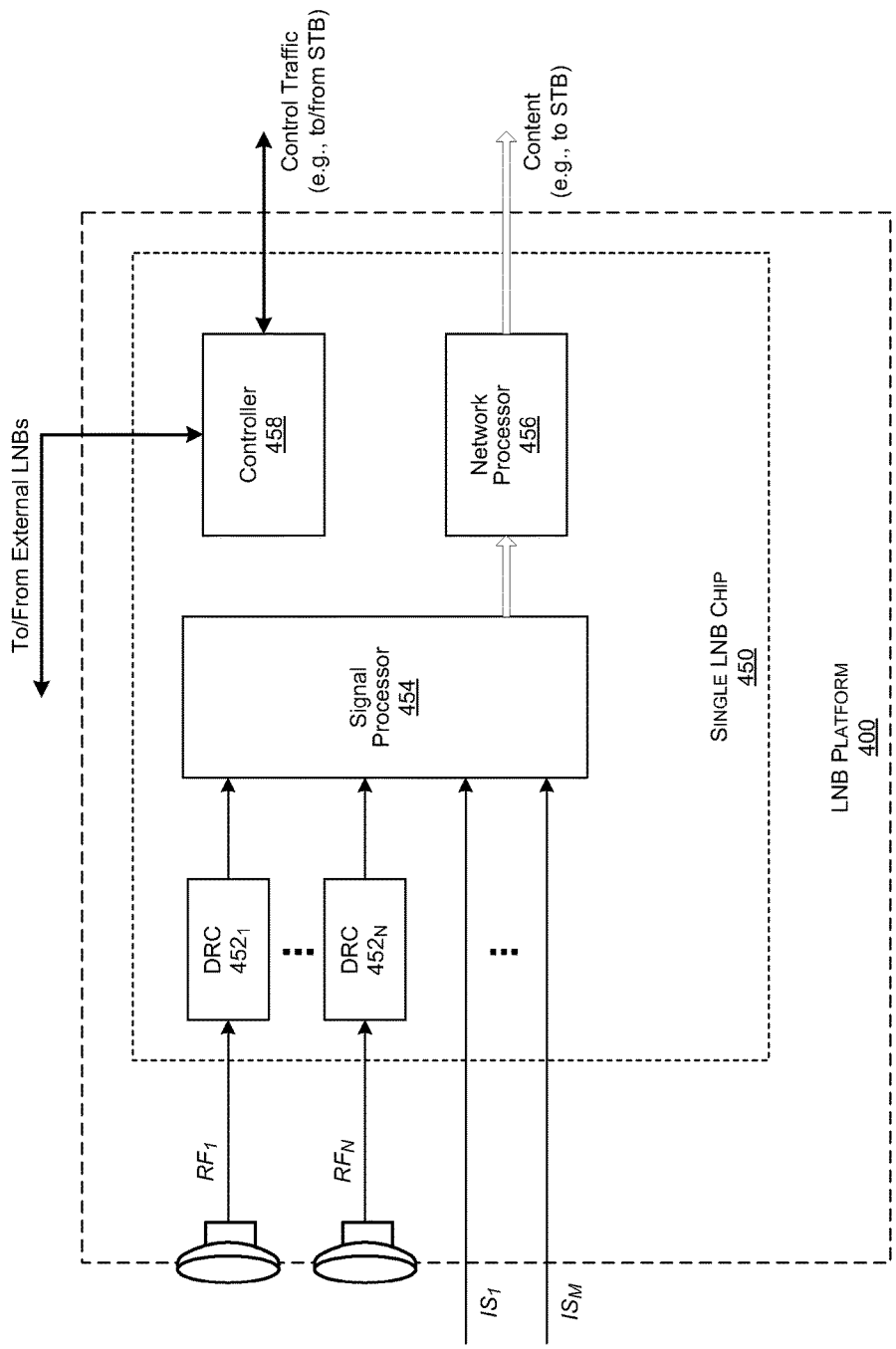
FIG. 4 illustrates an example low-noise block downconverter (LNB) platform that may incorporate a LNB chip configured for handling different bands with on-chip down-conversion of at least some of the bands.

FIG. 4 illustrates an example low-noise block downconverter (LNB) platform that may incorporate a LNB chip configured for handling different bands with on-chip downconversion of at least some of the bands. Referring to FIG. 4, there is shown a LNB platform 400.

The LNB platform 400 may comprise suitable circuitry, interfaces, logic, and/or code for receiving and handling signals, such as satellite signals. In this regard, the LNB platform 400 may be configured to perform such functions as low-noise amplification, filtering, downconverting (e.g., particular received RF (satellite) signals, such as K, Ku or Ka-band signals, to generate IF signals in the L-band, half-L-band, or Ext-L-band), analog-to-digital conversion (ADC), and other. The LNB platform 400 may also be configured to support interactions with other devices/systems that may be used in conjunction with handling of received signals (and/or consumption of content carried thereby). For example, the LNB platform 400 may comprise suitable circuitry, interfaces, logic, and/or code for support communication of signals corresponding to the received RF signals (e.g., containing content extracted therefrom) to in-home gateways or STBs, and/or to communicate (unidirectionally or bidirectionally) control related information (e.g., to tune to specific bands, sub-bands, or channels) with these devices/systems.

In various implementations of the invention, the LNB platform 400 may incorporate single integrated circuits (chips) for handling both unprocessed satellite signals (e.g., K/Ku/Ka-band signals, or simply 'K-band' signals) and to handle pre-processed signals (e.g., L/half-L/Ext-L-band signals, or simply 'L-band' signals), which may originate from different sources, such as external LNBs. For example, the LNB platform 400 may comprise one or more chips (e.g., LNB chip 450), each of which may be configured (e.g., using on-chip components) to concurrently support handling different types of signals (e.g., support bands corresponding to the directly received signals, such as in K/Ku/Ka-band satellite signals, as well as bands corresponding to partially processed signals, such as L/half-L/Ext-L-band IF signals, resulting from down-converting K-band signals for example).

For example, the LNB chip 450 may comprise suitable circuitry, interfaces, logic, and/or code configured to perform LNB based functions (including downconversion of received RF signals into corresponding IF signals) as well as to handle partially processed signals, such as in other/external LNB blocks. The LNB chip 450 may be operable to handle, for example, N ('N' being positive integer) unprocessed inputs (e.g., RF inputs $RF_1$-$RF_N$, corresponding to N different K-band inputs for example,) and to handle, for example, M ('M' being positive integer) partially-processed inputs (e.g., $IS_1$-$IS_M$, corresponding to, for example, M different L-band inputs). For example, the LNB chip 450 may comprise a plurality of direct conversion receivers (DCRs) 452$_1$-452$_N$, a signal processor 454, a network processor 456, and a controller 458. In this regard, each of the DCRs 452$_1$-452$_N$ may be operable to receive RF signals (e.g., corresponding to unprocessed K-band signals), and down-convert them (e.g., to L-band signals). Each of the DCRs 452$_1$-452$_N$ may be similar to, and/or may function in similar manner as, the K-band DCR portion 310 of FIG. 3.

The signal processor 454 may be operable to perform various functions or operations necessary to recover or extract data (e.g., content) carried in the received signals. In this regard, the signal processor 454 may be configured to handle signals in the down-converted bands (e.g., L-bands). Accordingly, the signal processor 454 may receive (directly) the partially-processed inputs $IS_1$-$IS_M$, and outputs of the DCRs 452$_1$-452$_N$ (corresponding to processing—e.g., down-conversion—of the unprocessed inputs $RF_1$-$RF_N$). Operations or functions performed by the signal processor 454 may comprise, tuning (e.g., full-spectrum-capture, of FSC, tuning), filtering, amplification, analog-to-digital conversion, demodulation, and the like. The signal processor 454 may output data (e.g., transport streams (TS), which may be modulated according to particular standard for example, such as MPEG) corresponding to the processed input signals (unprocessed and/or partially processed inputs).

The network processor 456 may be operable to handle communicating data (e.g., extracted content) corresponding to the processed inputs, to other devices (e.g., gateway 102 of FIG. 1). For example, the network processor 456 may be configured to generate IP packets (e.g. based on TS outputted by the signal processor 454), and/or perform MAC/PHY processing as necessary to communicate the IP packets.

The controller 458 may be operable to control at least some of the operations performed by (or in) the LNB chip 450. For example, the controller 458 may be configured to generate control signals to control or adjust functions or operations of various components of the LNB chip 450. In some instances, the controller 458 may be configured to interact with other, external entities (devices, systems or the like), such as, for example, using digital satellite equipment control (DiSEqC) signaling. For example, the controller 458 may support interactions with the devices receiving the output of the LNB chip 450 (e.g., gateways/STBs), for example to coordinate communication of the data and/or adjust the data (e.g., change select channels). The controller 458 may also support interactions with the devices sending signals/inputs to the LNB chip 450, such as external LNBs for example, sending partially-processed (e.g., downconverted to L-band) singles.

The LNB chip 450 may utilize to handle satellite signals, particularly handling both unprocessed signals (e.g., K-band signals) and processed (partially) signals (e.g., L-band signals, corresponding already down-converted signals, such as via external LNBs). In this regard, the LNB chip may be operable to provide on-chip down-conversion of unprocessed signals, as part of the overall processing performed thereby, while also being operable to forgo that down-conversion when handling already processed signals. Use of chips such as the LNB chip 450 may be desirable because inclusion of the down-conversion directly on the chip may allow reducing cost (e.g., by reducing circuitry floorplan/area), and enhancing performance (e.g., reducing processing time, since more operations are done on the same chip). In addition, by incorporating the capability to support handling of already-processed signals, the chip may be utilized in a manner that may ensure backward compatibility—e.g., a signal receiver integrating the chip may still be able to work with legacy/existing LNB systems.

Figure 5:
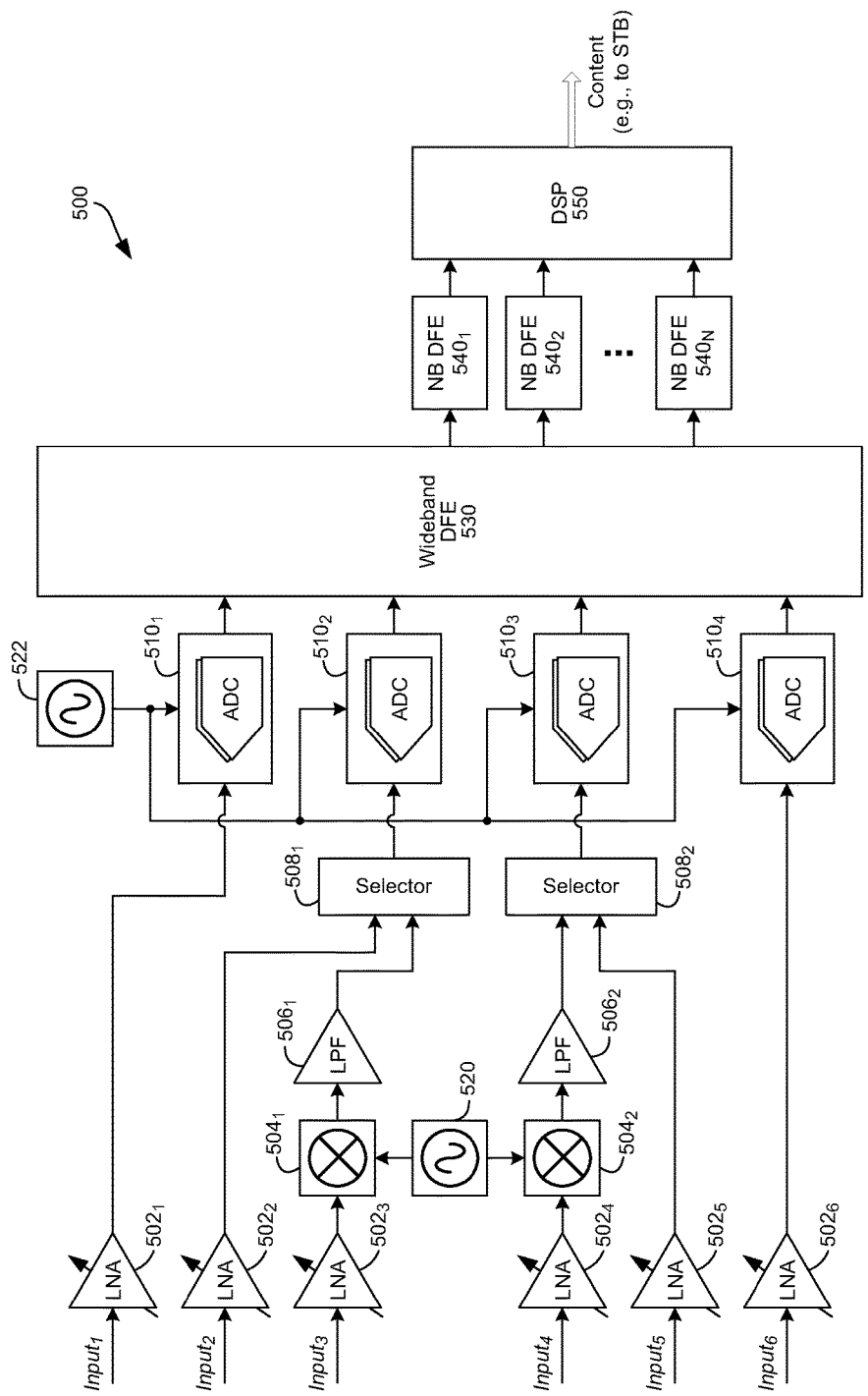
FIG. 5 illustrates a portion of an example receiver chip that is configured for handling different bands with on-chip down-conversion and reconfigurable time-interleaved analog-to-digital conversion (ADC).

FIG. 5 illustrates a portion of an example receiver chip that is configured for handling different bands with on-chip down-conversion and reconfigurable time-interleaved analog-to-digital conversion (ADC). Referring to FIG. 5, there is shown a chip 500.

The chip 500 may comprise suitable circuitry, interfaces, logic, and/or code for use in handling and/or processing signals. In this regard, the chip 500 may be configured to handle and/or process signals in accordance with particular functionality, such as part of LNB functionality (in full or part). The chip 500 may be configured to support handling or processing, separately or concurrently, signals corresponding to different bands, which may allow use of the chip 500 for providing selective on-chip direct/down-conversion of received RF signals as well partially received signals (e.g., satellite signals that have already been down-converted via other components or devices, such as external LNB blocks). The chip 500 may correspond to an example implementation of the LNB chip 450 (or portion thereof) of FIG. 4. As shown in the implementation depicted in FIG. 5, the chip 500 may be configured to support 2 unprocessed signals (inputs 3 and 4)—e.g., corresponding to RF signals (e.g., satellite K/Ka/Ku-band based signals) as received, and 4 partially-processed (e.g., already down-converted) signals (inputs 1, 2, 5 and 6)—e.g., corresponding to L/half L/Ext-L-band based IF signals. The disclosure, however, is not so limited, and in various implementations different number of inputs and/or combinations unprocessed/partially-processed signals may be supported, and may be used with other types of signals (i.e., non-satellite signals).

For example, as shown in FIG. 5, the chip 500 may comprise a plurality (e.g., six) of low-noise-amplifiers (LNAs) 502$_1$-502$_6$, a plurality (e.g., two) of mixer blocks 504$_1$-504$_2$, a plurality (e.g., two) of low pass filters (LPF) 506$_1$-506$_2$, a plurality (e.g., two) of selectors 508$_1$-508$_2$, a plurality (e.g., four) of analog-to-digital convertor (ADC) blocks 510$_1$-510$_4$, local oscillator (LO) blocks 520 and 522, a wideband (WB) digital-front-end (DFE) 530, a plurality of narrowband (NB) digital-front-ends (DFEs) 540$_1$-540$_N$, and a digital signal processing (DSP) 550.

Each LNA 502$_i$ may be operable to amplify signals. In this regard, LNAs may typically be used to amplify possibly weak signals, such as signals captured via antennas and other means for capturing wirelessly communicated signals (e.g., satellite signals).

Each mixer block 504$_i$ may be operable to mix (e.g., multiply) a plurality of signals. For example, in some instances, the pair of mixer blocks 504$_1$ and 504$_2$ may be used to apply, respectively, in-phase and quadrature signals—i.e., signals that would allow extraction of in-phase (I) and quadrature (Q) components corresponding to particular received RF signals, such as to allow IQ calibration. Thus, the inputs 3 and 4 may actually correspond to the same RF input. Alternatively, each of the mixer blocks 504$_1$ and 504$_2$ may be configured to apply both of the I/Q components, thus each of the inputs 3 and 4 may correspond to different RF signals. Thus, each of the mixer blocks 504$_1$ and 504$_2$ may actually comprise two mixers, each of which being configured to apply the mixing necessary to extract one of the I and Q components corresponding to an RF input (and, also, the input from LO 520 to each of the mixer blocks $504_1$ and $504_2$ may actually comprise two different input signals, each being specifically configured for the extraction of one of the I/Q components); and the output of each of the mixer blocks $504_1$ and $504_2$ may actually comprise two distinct outputs—that is the I and Q components of the corresponding RF input).

Each LPF $506_i$ may be operable to filter an input signal, passing only portion(s) corresponding to low band, and filtering out portion corresponding to higher band. For example, the LPF $506_i$ me be configured to pass only signals up to 1 GHz.

Each ADC block $510_i$ may be operable to perform analog-to-digital conversion. In this regard, the ADC block $510_i$ may be configured to perform the analog-to-digital conversion by sampling the input analog signal periodically (e.g., obtaining samples at particular times, as determined by the sampling rate). In other words, the ADC block $510_i$ may operate by converting a continuous-time and continuous-amplitude analog signal to a sequence of digital values (i.e., a discrete-time and discrete-amplitude digital signal). In some instances, one or more of ADC block $510_i$ may incorporate multiple ADC slices (rather than a single ADC). For example, at least each of the ADC blocks $510_2$ and block $510_3$ may incorporate two ADC slices. The use of multiple ADC slices may allow re-configurability of analog-to-digital conversion operation, particularly in time-interleaved manner. In this regard, when handling inputs that are downconverted within the chip 500 (e.g., inputs 3 or 4), the ADC block may be configured to handle the I/Q components of the inputs—e.g., a first ADC slice may be configured and used as 'I_slice'—i.e., used to perform analog-to-digital conversion on I-component, whereas a second ADC slice may be configured as 'Q_slice'—i.e., used to perform analog-to-digital conversion on Q-component. On the other hand, when handling already downconverted inputs (e.g., inputs 2 or 5), the two ADC slices may be configured such that may be used together to perform analog-to-digital conversion on the whole input—i.e., each slice being used to sample the input at different instances, such that the overall resultant digital output corresponding to the input results from combining of both sample streams.

Each selector $508_i$ may be operable to select an output (or more) from among a plurality of inputs. The selection performed by each selector $508_i$ may be based on, for example, predefined criteria, parameters, or conditions, and/or control signal(s). The selectors $508_1$-$508_2$ may be used to select inputs to the ADC blocks $510_2$ and $510_3$. Accordingly, by selecting between the different inputs to the selectors $508_1$-$508_2$, may be used to select inputs to the ADC blocks $510_2$ and $510_3$.

Each of the LO blocks 520 and 522 may be operable to generate local signals, having particular frequencies, such as for use in signal processing operations. For example, the LO block 520 may be utilized to generate local in-phase (I) and quadrature (Q) signals, corresponding to particular input RF signals (e.g., K-band signals), for use in extraction of in-phase and quadrature components (e.g., using the mixers $504_1$ and $504_2$) for example. The LO block 522 may be utilized in generating local signals driving the ADC blocks $510_2$ and $510_3$.

The DFE 530 may be operable to perform various signal processing functions, such as I/Q calibration, equalization, channelization, or the like. In an example implementation, the DFE 530 may also be configured to function as multiple input/multiple output switching crossbar (Xbar), whereby one or more inputs may be processed, combined and/or mapped to one or more outputs. The DFE 530 may be configured as a wideband processing block—i.e., being operable to apply the various processing function on a wideband (such as a full L-band, K-band, or the like). Each of the NB-DFEs $540_1$-$540_N$ may be similar to the DFE 530—i.e., being configured to provide similar (digital-front-end or DFE) processing functions, but to do so on narrow bands. Accordingly, the NB-DFEs $540_1$-$540_N$ may be operable to handle and/or process different sub-bands within a wideband that is processed in the DFE 530.

The DSP 550 may comprise suitable circuitry, interfaces, logic, and/or code for digitally manipulating and/or applying computationally intensive digital based processing on data during communication operations (e.g., on samples that may be obtained from digitization of signals, such as result of application of analog-to-digital conversion). The DSP 550 may be operable to perform, for example, encoding/decoding, modulation/de modulation, encryption/decryption, scrambling/descrambling, channel selection and/or filtering, digital scaling, and/or rate conversion. In some instances, the DSP 550 may be configured to process digitized data to enable communicating it (in digital form and/or after conversion to analog signals) over particular interface (e.g., based on the type of the link 107 of FIG. 1). In this regard, the DSP 550 may be operable to select, apply, and/or adjust a modulation scheme, error coding scheme, and/or data rates based on type and/or characteristics of interface being used in communicating the signals (carrying the data).

The chip 500 may be utilized to handle satellite signals, particularly both unprocessed signals (e.g., K-band signals) and (partially) processed signals (e.g., L-band signals, corresponding already down-converted signals, such as via external LNBs). For example, inputs 3 and 4 may correspond to unprocessed signals whereas inputs 1-2 and 5-6 may correspond to pre/partially processed signals. Accordingly, to handle unprocessed signals, the (RF) inputs (fed as inputs 3 and 4) may first be amplified via the LNAs $502_3$ and $502_4$, and then LO block 520 may be configured to generate suitable I/Q signals, for each of the inputs 3 and 4. For example, the inputs 3 and 4 may comprise signals in the 10.75 to 12.75 GHz range, and the I/Q signals generated by the LO block 520 may be in 11.75 GHz range. The I/Q signals may then be applied via the mixer $504_1$ and $504_2$ (i.e., each of the mixer $504_1$ and $504_2$ may apply both I and Q signals—accordingly, each of the mixer $504_1$ and $504_2$ may be implemented as dual mixers, one for each of the I/Q signals). The output of the mixer $504_1$ and $504_2$ may then be filtered, via the LPFs $506_1$ and $506_2$, to obtain only portions in the lower bands (e.g., in the 1 GHz band). Thus, the on-chip down-conversion of inputs 3 and 4 may be complete. The selectors $508_1$ and $508_2$ may then be configured (e.g., via suitable control signal(s)) to select, for output, the (filtered) signals outputted by the LPFs $506_1$ and $506_2$. The ADC blocks $510_2$ and $510_3$ may then be utilized to apply analog-to-digital conversion, with the corresponding outputs being feed to DFE 530, for handling thereby, and/or by the remaining components—e.g., NB-DFEs $540_2$-$540_N$ and the DSP 550, to enable extracting data (e.g., content), and generate corresponding output(s), for communication to, for example, a gateway/STB.

To handle pre-processed signals, the inputs (fed as inputs 1-2 and 5-6) may first be amplified via the LNAs $502_1$, $502_2$, $502_5$ and $502_6$. Next, because on-chip down-conversion is not require (having been done off-chip), the down-conversion components (e.g., the LO block 520, the mixer $504_1$ and $504_2$, and the LPFs $506_1$ and $506_2$) may be bypassed or disabled. The outputs of the LNAs $502_1$ and $502_6$ (corresponding to inputs 1 and 6), may then be inputted into the ADC blocks $510_1$ and $510_4$. As for inputs 2 and 5, the selectors $508_1$ and $508_2$ may then be configured (e.g., via suitable control signal(s)) to select, for input into the ADC blocks $510_3$ and $510_4$, the signals outputted by the LNAs $502_2$ and $502_5$. The ADC blocks $510_1$-$510_4$ may then be utilized to apply analog-to-digital conversion on all of the inputs 1-2 and 5-6, with the corresponding outputs being feed to DFE 530, for handling thereby, and/or by the remaining components—e.g., NB-DFEs $540_2$-$540_N$ and the DSP 550, to enable extracting data (e.g., content), and generate corresponding output(s), for communication to, for example, a gateway/STB.

Figure 6:
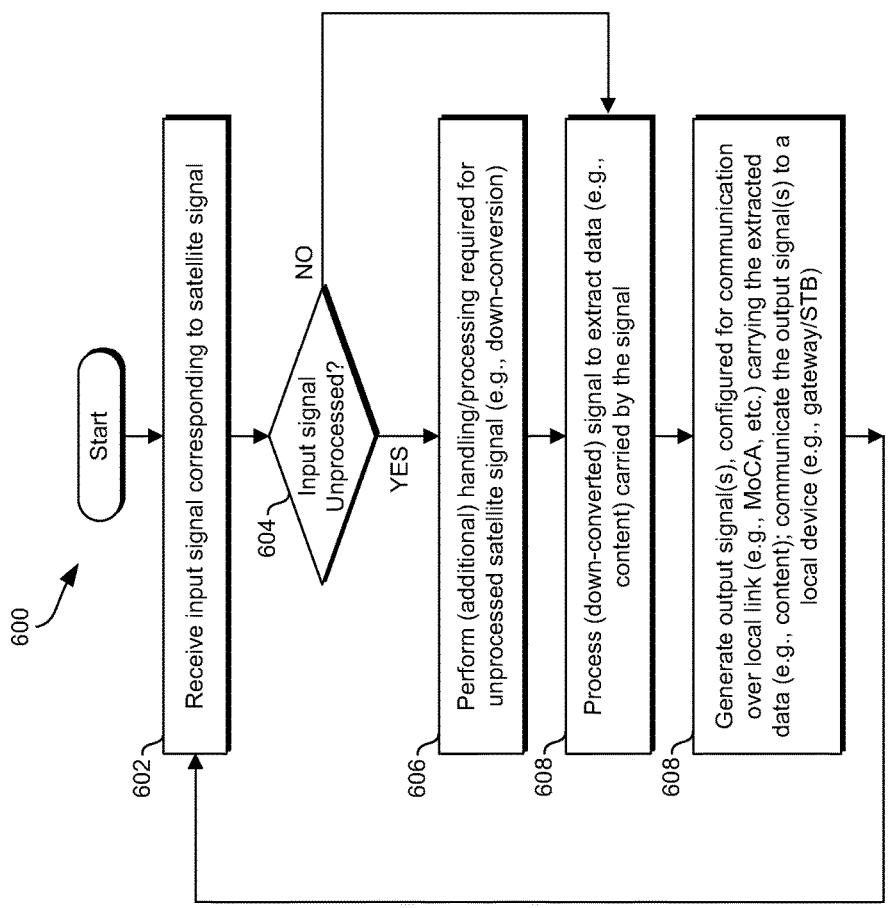
FIG. 6 is a flow chart that illustrates an example process for selectable on-chip band down-conversion while handling multiple bands.

FIG. 6 is a flow chart that illustrates example process for selectable on-chip band down-conversion while handling multiple bands. Referring to FIG. 6, there is shown a flow chart 600 comprising a plurality of example steps, which may be performed in a receiver chip (e.g., chip 500) that is configured to support on-chip downconversion, to handle different satellite bands.

In step 602, the chip may receive an input signal corresponding to a satellite signal. In step 604, it may be determined whether the received input signal is unprocessed or pre/partially processed signal. In this regard, unprocessed signals may correspond to satellite signals as received (over-the-air), whereas pre/partially processed signals may correspond to signals that have been received and already partially handled (e.g., via external LNB). For example, the unprocessed signals may comprise K/Ku/Ka-band signals whereas the pre/partially processed signals may comprise L/half-L/Ext-L-band signals. In instances where it may be determined that the received input signal is unprocessed, the process may proceed to step 606. In step 606, the unprocessed signal may be handled—e.g., by performing necessary (additional) handling/processing required for unprocessed satellite signal, including down-conversion (e.g., from K/Ku/Ka-band to L/half-L/Ext-L-band) for example. The process may then proceed to step 608.

Returning to step 604, in instances where it may be determined that the received input signal is pre/partially processed; the process may skip step 606, and jump directly to step 608. In step 608, the (down-converted) signal may processed, such as to extract data (e.g., content) carried by the signal. Processing down-converted signal may comprise analog-to-digital conversions, for example. In step 610, output signal(s) may be generated, based on the processing of the input signals, being configured for communication over a local link (e.g., MoCA, etc.) carrying the extracted data (e.g., content). The output signal may then be communicated to a local device (e.g., gateway/STB). In some instances, data (e.g., content) may be combined from multiple input signals onto a single output, such as using stacking techniques. Once the output is generated and/or communicated, the process may loop back to step 602.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for reconfigurable time-interleaved ADC for direct conversion K-band and L-band I/Q.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed:

1. A system, comprising:
one or more circuits for use in a signal receiver chip, the one or more circuits being operable to:
receive a satellite signal; and
when the satellite signal is partially-processed off-chip:
bypass during processing of the satellite signal at least a portion of processing functions applied in the signal receiver chip; and
modify at least one processing function, applied during processing of the satellite signal, that is not by-passed to handle the satellite signal in a different manner than when signals that are not partially-processed off-chip are handled.

2. The system of claim 1, wherein the at least a portion of processing functions comprises signal band conversion.

3. The system of claim 2, wherein the signal band conversion comprises down-converting from a first band used for over-the-air communication to a second band that is used during handling at receiver side.

4. The system of claim 3, wherein the first band comprises K-band, Ku-band, or Ka-band.

5. The system of claim 3, wherein the second band comprises L-band, half-L-band, or Extended-L-band.

6. The system of claim 1, wherein the one or more circuits are operable to generate an output signal, corresponding to the satellite signal, the output signal is configured for communication to a peer device.

7. The system of claim 6, wherein the peer device comprises a satellite set-top box (STB).

8. The system of claim 6, wherein the one or more circuits are operable to generate the output signal such that to enable distributing content carried in the output signal to a plurality of client devices in a local network serviced by the peer device.

9. The system of claim 6, wherein the one or more circuits are operable to combine a plurality of portions, corresponding to a plurality of satellite signals, into the output signal.

10. The system of claim 6, wherein the one or more circuits are operable to configure the output signal based on connection to the peer device, the connection comprising at least one: a coaxial cable based connection, a twisted-pair based connection, a Multimedia over Coax Alliance (MoCA) based connection, an Ethernet based connection, and a Direct Broadcast Satellite (DBS) based connection.

11. The method of claim 10, comprising generating an output signal, corresponding to the satellite signal, wherein the output signal is configured for communication to a peer device.

12. The method of claim 11, wherein the peer device comprises a satellite set-top box (STB).

13. The method of claim 11, comprising generating the output signal such that to enable distributing content carried in the output signal to a plurality of client devices in a local network serviced by the peer device.

14. The method of claim 11, comprising combining a plurality of portions, corresponding to a plurality of satellite signals, into the output signal.

15. The method of claim 11, comprising configuring the output signal based on connection to the peer device, the connection comprising at least one: a coaxial cable based connection, a twisted-pair based connection, a Multimedia over Coax Alliance (MoCA) based connection, an Ethernet based connection, and a Direct Broadcast Satellite (DBS) based connection.

16. A method, comprising:
  in a signal receiver chip,
    receiving a satellite signal; and
    when the satellite signal is partially-processed off-chip:
      bypassing at least a portion of processing functions performed in the signal receiver chip; and
      modify at least one processing function, applied during processing of the satellite signal, that is not by-passed to handle the satellite signal in a different manner than when signals that are not partially-processed off-chip are handled.

17. The method of claim 16, wherein the at least a portion of processing functions comprises signal band conversion.

18. The method of claim 17, wherein the signal band conversion comprises down-converting from a first band used for over-the-air communication to a second band that is used during handling at receiver side.

19. The method of claim 18, wherein the first band comprises K-band, Ku-band, or Ka-band.

20. The method of claim 18, wherein the second band comprises L-band, half-L-band, or Extended-L-band.

* * * * *